United States Patent [19]

Mook, Jr.

[11] Patent Number: 4,903,200

[45] Date of Patent: Feb. 20, 1990

[54] POINT OF SALE APPARATUS

[75] Inventor: William H. Mook, Jr., Columbus, Ohio

[73] Assignee: Mueller and Smith, LPA, Columbus, Ohio

[21] Appl. No.: 323,072

[22] Filed: Mar. 10, 1989

Related U.S. Application Data

[63] Continuation of Ser. No. 941,190, Dec. 12, 1988, abandoned.

[51] Int. Cl.⁴ .............................................. G06F 9/00
[52] U.S. Cl. .................................................. 364/405
[58] Field of Search ...................... 364/200, 900, 405; 235/379

[56]  References Cited

U.S. PATENT DOCUMENTS

| | | | |
|---|---|---|---|
| 3,946,220 | 3/1976 | Brobeck et al. | 364/200 |
| 4,328,544 | 5/1982 | Baldwin et al. | 364/900 |
| 4,389,707 | 6/1983 | Tsuzuki | 364/405 |
| 4,396,985 | 8/1983 | Ohara | 364/405 |
| 4,630,200 | 12/1986 | Ohmae et al. | 235/379 |
| 4,634,845 | 1/1987 | Hale et al. | 235/379 |
| 4,722,054 | 1/1988 | Yorozu et al. | 235/379 |

OTHER PUBLICATIONS

Ohio Restaurant Journal, Nov./Dec., 1984, p. 33.

Primary Examiner—Gareth D. Shaw
Assistant Examiner—John G. Mills
Attorney, Agent, or Firm—Mueller and Smith

[57]  ABSTRACT

Point of sale apparatus wherein a general purpose computer is utilized in emulating the functions of an integrated POS system. A general purpose computer is employed with a cash register specific keyboard to provide a broad range of computational and data handling capabilities for the apparatus. To perform in conjunction with the general purpose computer for its general computing function, a typewriter-type keyboard is employed with the apparatus. A prioritized protocol is developed between the two keyboard functions giving operational priority to the latter keyboard. To achieve a necessary reaction to cash register keying operations, a device driver program is positioned at a high priority level in the BIOS area of memory of the general computer to develop a vector interrupt deriving a jump address approach to the execution of cash register key function commands.

24 Claims, 12 Drawing Sheets

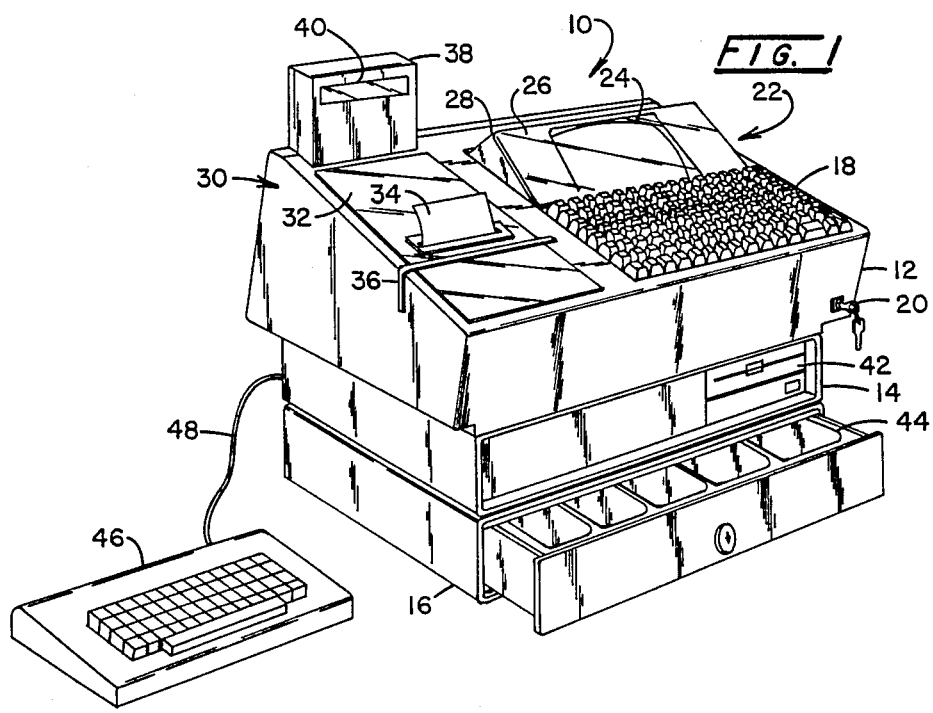
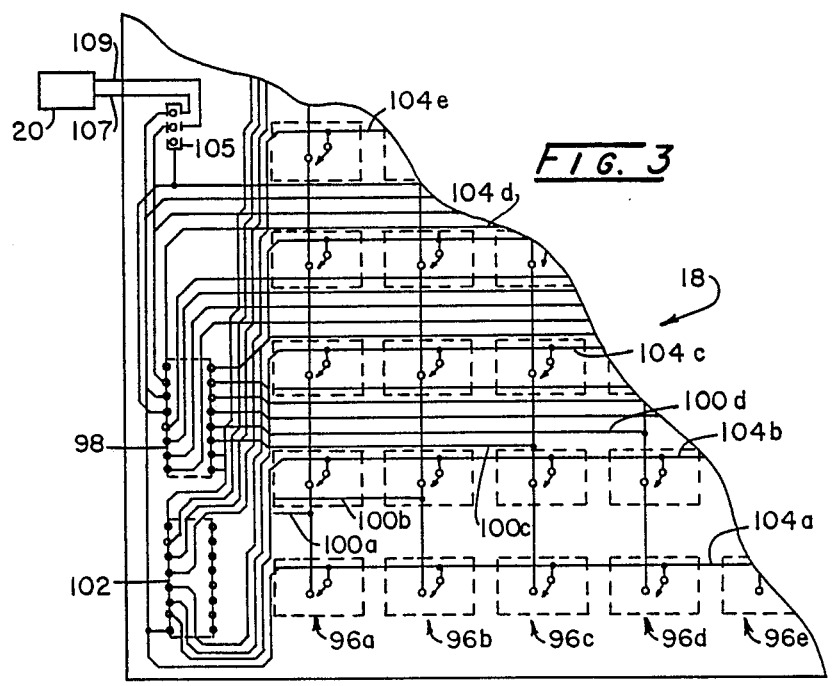

POINT OF SALE APPARATUS

This application is a continuation of application Ser. No. 06/941,190 filed 12/12/88, now abandoned.

BACKGROUND

Cash registers traditionally have functioned to monitor and record commercial transactions in retail establishments. Located at the point of sale (POS), these devices have permitted the merchant to use clerical employees to handle financial transactions without particularly close supervision. Conventionally, cash registers incorporate a keyboard, display showing the customer the amount of the transaction, a cash drawer which opens only following the entry of sale data through the keyboard, and a printer for providing a receipt and for maintaining a journal.

As electronic processing technology has developed, the above functions have been enhanced to improve operator performance and achieve savings in labor. In the latter regard, efficiencies are realized with improved operator keying due to improved keyboard design, highly visible displays, operator prompts and instantaneous calculations of tax, sub-totals, totals and change. Further efficiencies, for outlets having extensive inventories may be realized through the use of a variety of tag reader systems employing bar codes and the like.

A selection of the degree of sophistication of POS device systems generally is predicated upon cost factors, as well as the degree of inventory and accounting control required by the retail establishment. The more elaborate systems available in the marketplace generally are referred to as "integrated POS systems" and are seen to involve a larger number of POS terminals which are networked under the control of a "back room" or regionally situated computer having significant programming capabilities. The POS terminals themselves for these integrated systems are basic in a technical sense, having very limited and software specific logic capabilities. Over the recent past, economic considerations involved in the selection of POS equipment have favored investment in integrated POS systems where five or more POS terminals are required. Marketing anaylsis has shown that about 85 percent of retail outlets employ five or fewer POS locations and thus, with some exceptions as are seen, for example, in fast food and bookstore operations, cost considerations limit the majority of retailers to cash register devices of lesser sophistication. Generally, these less expensive terminals employ programmable processors but the devices are of a special purpose nature having limited memory and are not readily programmed to change their functions in accordance with the particular desires of a given retail establishment. Further the devices do not carry out inventory control nor do they have the capabilities which are available in the now ubiquitous personal computer.

Cash register equipment has been made which simply combines the readily programmable general purpose computer with peripheral devices such as printers, CRT monitors and cash drawers to evolve a stand-alone POS terminal with wide programming capabilities. These terminals have not found acceptance in the marketplace, however, for a variety of reasons. Principal among these reasons is the relative slowness of the computer devices in carrying out basic cash register functions. It may be recalled that currently marketed basic cash register terminals include cash register specific software in a hardware system which achieves requisitely higher operational speeds. However, where the general purpose computer is programmed to emulate a cash register, from the point in time of a given key actuation by the operator, too lengthy an interval persists until items are displayed at the CRT monitor and computations are concluded to printout a receipt. Further, the employee-clerk usually called upon to use such a device is confronted with the environment of a computer, which appears complex, as compared with the familiar, easy to understand and operate cash register. Often, conventional typewriter structured keyboards typically employed with computers are used with these terminals which are difficult for clerical help to use. Notwithstanding the above, where the disadvantages of the integration of a general purpose computer with a POS cash egister function can be avoided, significant business advantage will accrue to an important very large segment of the retail marketing service industry.

SUMMARY

The present invention is addressed to point of sale apparatus which effectively combines the desirably broad based computational and data handling power of the general purpose computer with the function of a cash register. Structured to achieve a "cash register environment and appearance" which is both familiar in visual structure as well as user friendly to the typical retail outlet clerk, the new computational POS apparatus achieves necessary rapid reaction times or response to user keying, while remaining fabricable at costs targeted to the needs of the smaller retail merchant.

Two keyboards are employed with the apparatus which operate under the prioritized protocol of a microprocessor performing in conjunction with the general purpose computer. The first of these is a cash register operation specific keyboard which is mounted with the housing of the apparatus in the manner appearing as a typical cash register key array. While emulating a typical computer or typewriter keyboard in terms of its interaction with the general purpose computer, this keyboard enjoys access to a very broad range of performance functions associated with the most sophisticated of integrated POS systems. The second keyboard employed with the POS apparatus is a typewriter or typical computer keboard as is normally associated with a general purpose computer and which operates in conventional manner. However, such operation permits the POS apparatus to be customized to a given small retail outlet by those service personnel who typically carry out that computer service feature in computer retail outlets. Thus, each merchant is capable of software structuring appropriate to the specific needs of the small local retail business without incurring onerous costs. This second keyboard also is capable of causing the POS apparatus to operate in a different functional mode, for example in carrying out inventory controls and a broad range of functions based upon surveyed keystroke data collected in the course of the cash register function of the apparatus.

To achieve the rapid response rates necessary to render the apparatus of the invention practical, a unique response architecture is employed with the combined microprocessor and general purpose computer. In particular, cash register function keystrokes are transmitted under the noted protocol in conjunction with delimiter codes which are detected by the operating system of the general purpose computer and prioritized by a device drive program located at a high priority level in basic input-output system (BIOS). The normal keyboard handler programming located at this prioritized memory region is then transferred or downloaded to the applications region of memory along with code programs. The latter programs are positioned at memory jump address locatable positions which are rapidly accessed by a device driver technique which employs the key codes of the cash register functioning keyboard operation to rapidly evolve the noted jump addresses. Because of the higher level of monitoring and control provided by the microprocessor of the apparatus in conjunction with the cash register type keyboard, priority then is given to the computer type keyboard in the protocol electing between the keyboards assuming somewhat joint operation of these functions.

Another feature of the invention is to provide apparatus for monitoring and recording commercial transactions which includes a housing positioned at the situs of the transaction which incorporates a cash register type keyboard mounted thereon and which is manually actuable to provide a select key output. A keyboard output port is provided for receiving and transmitting keyboard data signals and a microprocessor is mounted with the housing which includes a processor memory for retaining a unique key code corresponding with each key output and which is configured as a unique memory address and which represents an aspect of the transaction. The microprocessor includes a clock for providing an output of predetermined frequency and which is responsive to the key output for accessing the processor memory unique key code for effecting transmission of that unique key code along with a clock output as keyboard data signals from the keyboard output port. A general purpose computer is mounted with the housing having an operating system and including an input designated port coupled with the keyboard output port and which has output designated ports additionally. Further, the general purpose computer includes a memory for retaining a device driver program within a basic input-output system high priority locaton (BIOS) and a preloaded predetermined sequence of code programs at memory applications regions positions without the BIOS high priority locations. The operating system is responsive to the keyboard data signals to access the device driver program to establish a vector interrupt corresponding with the keyboard data signals to access the memory retained code programs on a priority basis and effect the execution thereof to derive a corresponding operation output at predetermined one of the designated output ports. A display is mounted with the housing which includes a video generator circuit and a visual display such as a CRT, the generator circuit is coupled with an output designated port and is responsive to the operation output for generating a perceptible output at the visual display. Further, the apparatus contains a printer coupled with an output designated port and which is responsive to the operation output for providing printed text corresponding therewith, for example in the form of a cash register receipt.

Another feature of the invention is to provide apparatus for monitoring and recording commercial transaction which includes a housing which is positioned at the situs of the transaction. The housing carries a first keyboard which is manually actuable to provide a select first key output and a second keyboard which is manually actuable to provide a select second key output representing a general computer function input. A keyboard output port is provided for receiving and transmitting keyboard data signals and a switch, for example in the form of a relay, is coupled intermediate the keyboard output port and the second keyboard and is controllable to assume non-conducting and conducting conditions for effecting a select transmission of the second key output to the keyboard output port. A microprocessor is provided mounted with the housing which includes read/write memory, processor memory retaining a unique key code corresponding with the first key output and which represents an aspect of each transaction. A clock provides a processor clock signal of predetermined frequency and the microprocessor is responsive to the first key output for accessing the processor memory unique key code and retaining it in the read/write memory. Additionally, the microprocessor is responsive in the absence of the second keyboard second key output for controlling the switch to provide the non-conducting condition and for effecting transmission of the unique key code and the processor clock signal as the keyboard data signals from the keyboard output port. The microprocessor further is responsive in the presence of the second keyboard second key output to provide the switch conducting condition to permit transmission of the second key output as the noted keyboard data signals from the keyboard output port. A general purpose computer is mounted with the housing having an operating system and including an input designated port coupled with the keyboard output port and further incorporates output designated ports. The operating system includes memory and is responsive to the transmitted keyboard data signals corresponding with the unique key code to access a preloaded code program within memory and implementing the transition output on a priority, vector interrupt bases to derive a corresponding operation output at predetermined ones of designated the output ports. The system is responsive to the transmitted keyboard data signals corresponding with the select second key outputs to derive a corresponding operation output at predetermined designated output ports. A display is provided with the housing which includes a video generator circuit and a visual display. The video generator circuit is coupled with the output port and is responsive to an operation output for generating a perceptible output at the visual display. The apparatus further includes a printer which is coupled with an output designated port and is responsive to the operation output for providing printed text corresponding therewith.

Other objects of the invention will, in part, be obvious and will, in part, appear hereinafter. The invention, accordingly, comprises the apparatus possessing the construction, combination of elements and arrangement of parts which are exemplified in the following description. For a fuller understanding of the nature and objects of the invention, reference should be had to the following detailed description taken in connection with the accompanying drawings.

BRIEF DESCRIPTION OF THE DRAWINGS

FIG. 1 is a perspective view of a POS apparatus according to the invention;

FIG. 3 is a fragmentary view of a keyboard circuit employed with the apparatus of FIG. 1;

DETAILED DESCRIPTION OF THE INVENTION

Figure 2A:
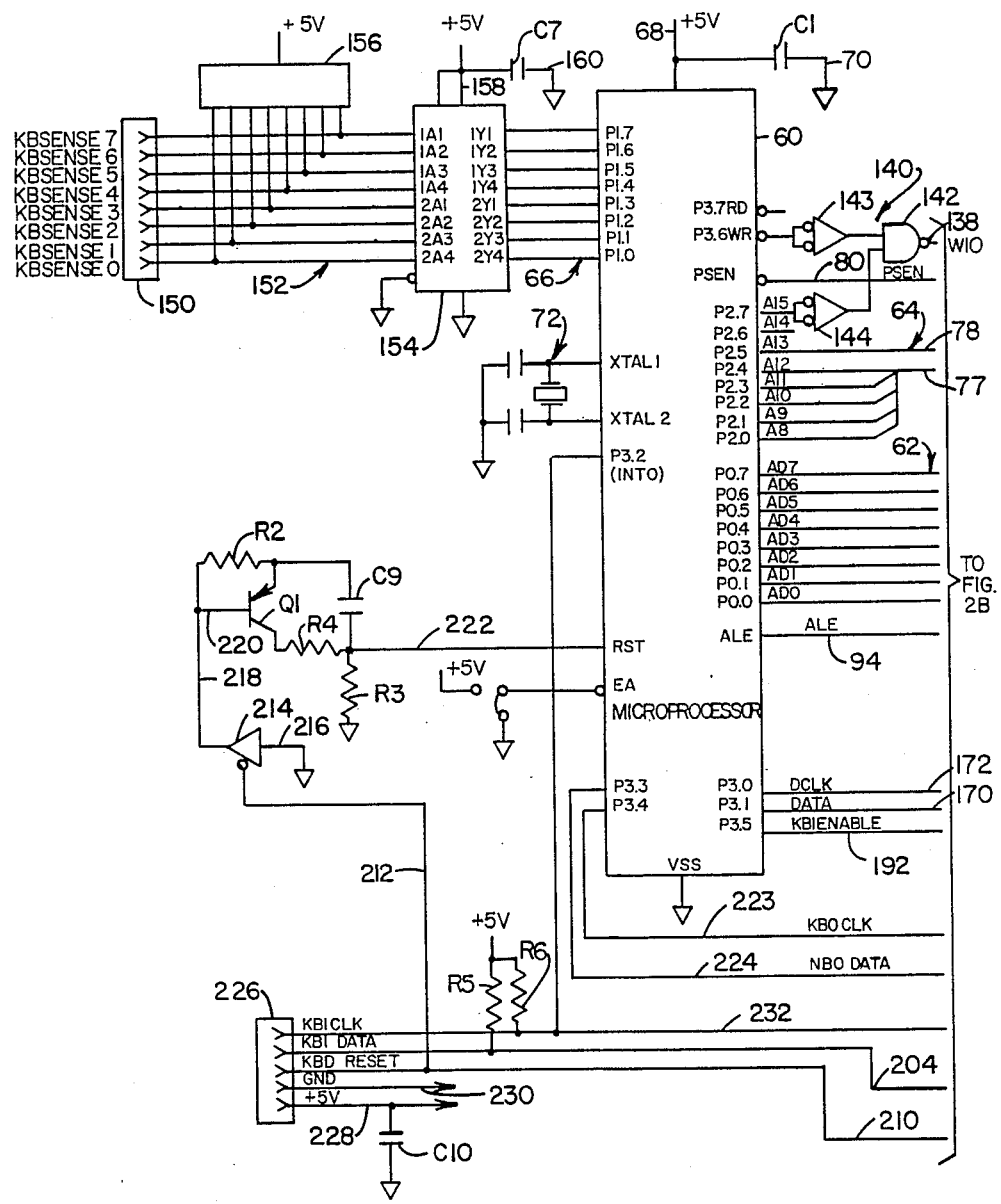
FIGS. 2A and 2B combine as labeled to provide an electronic schematic diagram of the microprocessor driven circuit components of the apparatus of FIG. 1.

The point of sale apparatus of the present invention is structured so as to accurately emulate the functions of a cash register, incorporating all of the equipment peripherals such devices now provide while, simultaneously, affording the retail user the data collection and computational power of a modern general purpose computer. This emulation of the cash register function is carried out at requisitely high reaction speeds and the structuring further is such that the typical retail clerk will be comfortable with the use of the device. Of particular advantage, the point of sale apparatus can be programmed by conventionally trained computer programmers such that even the smallest of retail establishments can customize the cash register function to its particular needs without incurring significant costs.

Looking to FIG. 1, the point of sale apparatus is represented generally at 10 as including an upper keyboard housing 12 which, in turn, rests upon a computer housing 14 which, for the embodiment shown, nests upon a cash drawer housing 16. Upper keyboard housing 12 is shown supporting a keyboard 18 which may, for example, incorporate about 120 keys which are arranged in a row and column matrix as is conventional for cash register applications. The functional designation for each of the keys at keyboard 18 is a matter of choice of the retail establishment owner and can be established in conjunction with a computer programmer. However, the conventionally encountered key functions will include a numeric keypad region, alphanumeric process keys, preset process keys which may, for example, identify purchases by items such as the particular form of food such as a sandwich. Department keys also may be incorporated as well as modifier keys which will indicate such designations as small, medium or large. The election of key designations, as noted is completely flexible at the desires of the local user and, more importantly, is inexpensively achieved. One key of the keyboard function may be actuated by a lock-key arrangement shown at 20 which may be employed for manager control over certain functions of the POS apparatus 10. The upper housing 12 additionally includes a visual display or readout 22 which is provided as a cathode ray tube (CRT) 24 serving as a monitor which is supported within an upwardly pivotal mounting 26. The upwardly disposed face of the mounting 26 as well as CRT 24 may be covered with a smoke plastic protective covering 28. Adjacent the keyboard 18 and the visual display 22 there is provided a printer shown generally at 30 which, as before, is positioned beneath a protective plastic sheet 32. The printer 30 provides a customer receipt as represented at 34 and also may be provided in narrow gauge fashion to provide for validation printing for checks or the like inserted within the slot 36. Slots 36 also may be used for credit card validation and the like depending upon the desires of the user. Sitting atop the upper housing 12 additionally is a small customer visual readout 38 which may provide an alpha-numeric readout by a conventional LCD display 40 or the like shown facing the operator side of the apparatus 10 in the interest of drawing clarity. The device 38 may be positioned at any convenient location within the POS environment, inasmuch as it is connected to the apparatus 10 through a cable (not shown).

The computer housing 14 includes flexible disk drive access slots as shown at 42 and functions to house the computer architecture including hard disk drives, the noted flexible disk drives and the circuitry associated with the general purpose computer incorporated in apparatus 10, as well as supporting microprocessor devices. Cash drawer housing 16 is shown incorporating a bearing supported and spring released cash drawer 44 which, in conventional manner, may be retained in its closed orientation by a solenoid actuated latch which, upon energization, releases the drawer for outward spring driven movement. Further in keeping with cash register convention, a simple bell clapper arrangement may be actuated in conjunction with the solenoid drive latch release.

The keyboard 18 matrix design is specific to the function of a cash register. Where the general purpose computational features of the POS apparatus are employed, then a typewriter type keyboard is used by the operator as represented at 46. Keyboard 46 is plugged into an appropriate port within the housing 14 by a standard computer keyboard cable as represented at 48. The keyboard 46 incorporates all of the function, computational, and typewriter-type keys typically employed with a general purpose computer and is coupled in daisy chain fashion with the keyboard function 18. Keyboard 46 not only may be employed for all of the functions available with a general purpose computer, but, for the application at hand, may be used by the retail merchant for purposes such as upgrading inventory designations or changing item descriptions in stock, as well as maintaining customer lists and the like. The general purpose computer of the apparatus 10 can be programmed to maintain an electronic journal by scanning all key strokes from the keyboard matrix 18 and can further develop an inventory program, extracting all inventory data and the like under the control of any of a number of desired inventory software programs. Typical of the "peripherals" or functional additions to the apparatus 10 will be local area network controllers which may be employed through the addition of appropriate circuitry through the I/O bus extension slots generally available with such general computers. Additional functions which are readily added include such components as bar code scanners, UPC (Universal Product Code) code readers as well as the earlier-noted credit validation systems. Thus, the device 10, while maintaining a cost in the marketplace suited for the small retailer, achieves substantial performance flexibilities. All of these features may be incorporated without undue cost and without resort to extensive consultation on the part of typical computer programming professionals.

Figure 2B:
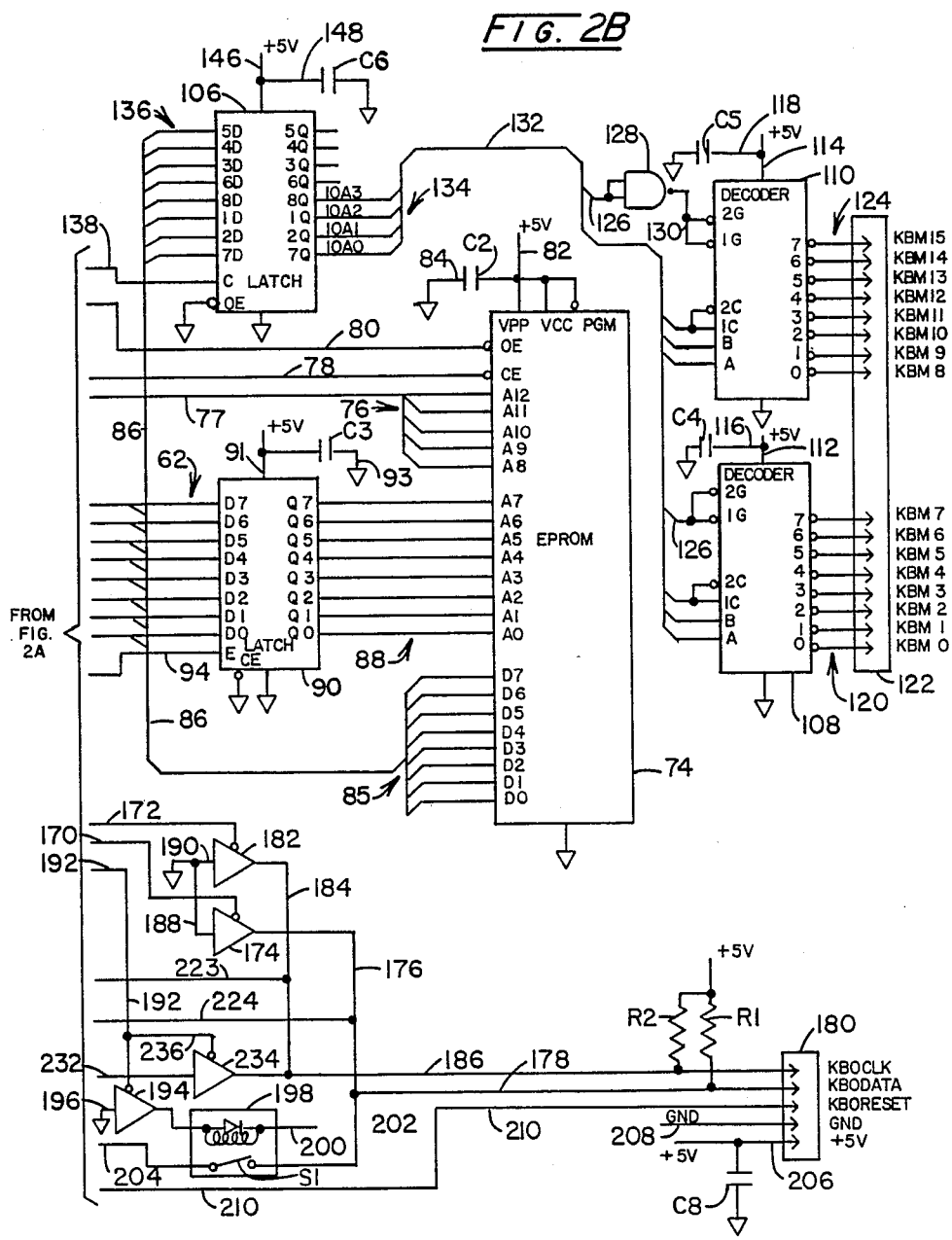

Now looking to FIGS. 2A and 2B, the microprocessor driven circuitry through which the practical union of the above features is achieved is revealed in electrical schematic fashion. The microprocessor for this circuit is represented at 60 in FIG. 2A and may be provided, for example, as a type 8031A marketed by Intel Corporation. Device 60 incorporates conventional microprocessor features including an internal random access (read/write) memory (RAM), four 8-bit I/O ports, internal timers and a programmable full duplex serial channel. The port, PO, grouping of the device is shown coupled to 8-bit lead array 62 labeled carrying address data signals AD0-AD7 representing low order address and data information. Similarly, a second port grouping is shown at P2 coupled with 8-bit lead array 64 and I/O port grouping P1 is shown coupled with lead array 66. A +5 v power supply is made available to the device 60 via line 68 which is shown including capacitor C1 coupled to ground through line 70. This power supply is derived from a corresponding power supply output from within the associated general purpose computer. Inputs from an 11 MHz crystal oscillator shown generally at 72 are provided to the XTAL1, XTAL2 ports of the device.

Microprocessor 60 performs in conjunction with a read only processor memory provided as an EPROM shown at 74 in FIG. 2B. In addition to retaining instructional data, the EPROM 74 retains unique key code data corresponding with each of the operational keys of the array 18 on the POS apparatus 10. These key codes are configured as unique memory addresses and represent an aspect of the transaction recorded or monitored by the apparatus 10 by the actuation of the keys at array 18. This unique key code will be seen to form an aspect of the necessary fast reaction rate of the entire system. Generally, the EPROM 74 is addressed from the port P2 outputs developed at lead array 64 and leading, in turn, through bus 77 to the array 76 of inputs at high order address port A8-A12. Select activation of the device 74 is provided by the chip enable input thereto at line 78 and the output enable provided from line 80. Line 78 is seen to emanate from port P2.5 and line 80 receives appropriate signals from the PSEN terminal of microprocessor 60. EPROM 74 is powered from +5 v supply as earlier described via line 82 which additionally is coupled through filtering capacitor C2 to ground via line 84. Data may be outputted through lead array 85 and data ports D0-D7 for placement upon bus 86. Additionally, data including the noted unique key codes is outputted from lower order ports A0-A7 via lead array 88. Array 88 is coupled to corresponding ports Q0-Q7 of a type 74LS373 latch shown at 90. Latch 90 is powered from +5 v via line 91 which power supply is filtered by capacitor C3 and line 93. The output of latch 90 is provided at ports D0-D7 which, in turn, are coupled via earlier-descibed lead array 62 to the P0 ports of microprocessor 60. Latch 90 is seen to be enabled via line 94 which, in turn, is coupled with the ALE terminal of microprocessor 60. Interaction of the keyboard array 18 and the microprocessor 60 involves the row-column polling of the switches corresponding with the rows and columns of keys of the array 18. Looking momentarily to FIG. 3, the key matrix structuring to provide for this polling arrangement is revealed in fragmentary fashion. For a typical matrix, 16 columns of key actuable switches are provided, five of which are represented at 96a-96e. Each such column is discretely energized under microprocessor control from a terminal block 98 shown labeled carrying the energization signals KBM 0-15. Note, in this regard, that 16 leads will extend to the columns, certain of which are represented at 100a-100d. Thus, as voltage is applied sequentially to each of the column leads, the corresponding sequence of eight rows may be polled for a voltage value to determine a key switch closure. Such switch closure is provided by closing the contacts represented by the two circles within each switch location or block shown in dotted fashion in the drawings. Sensing of the switch closure, as well as polling each of the discrete eight rows, is provided from a terminal block 102 certain of the leads extending therefrom to the rows for each of the switch blocks and represented at 104a-104e. The figure additionally shows a terminal block 105 having leads connected to terminal block 98. Leads as at 107 and 109 extend from block 105 to the switch function of the earlier described lock key 20.

Control over the insertion of polling signals to the columns of the sensing arrangement of FIG. 3 through terminal block 98 is derived from the microprocessor 60 performing in conjunction with a type 74LS374 latch 106 operating in association with type 74LS156 decoders 108 and 110. Decoders 108 and 110 are supplied from +5 v as earlier described via respective lines 112 and 114. Line 112 additionally is filtered via line 116 and capacitor C4, while, in similar fashion, line 114 is filtered via line 118 and capacitor C5. The eight output ports of decoder 108 are shown coupled via lead array 120 to terminal block 122 to provide the earlier-described voltage polling signals KMB0-KBM7 shown in FIG. 3. Similarly, the output of decoder 110 at lead array 124 is shown directed to terminal block 122 to provide the higher order keyboard decoding signals KBM8-KBM15. Decoder 108 is activated or selected from signals at line 126 directed to its 1G and 2G input terminals while in similar fashion, the tapping of the same lead 126 and inversion thereof at gate 128 provides the inverted election signal at line 130 directed to terminals 1G and 2G of decoder 110 for selection of higher order keyboard polling signals. Line 126 is one of the leads of a bus 132 extending to the 1Q, 2Q, 7Q and 8Q terminal outputs of latch 106 as represented by the array of connections at 134 shown carrying the signals IOA0-IOA3. The D input terminals 1D-7D of latch 106 are accessed from bus 86 extending to lead array 136 and by enablement at the C terminal thereof via line 138 which is developed from a sub-logic selection array 140 of OR functioning gates 142-144. Latch 106 is shown powered from the earlier-described +5 v power supply via line 146 which is filtered via line 148 and capacitor C6.

The eight row sensing lines extending to terminal block 102 in FIG. 3 carrying the signals "KBSENSC 0-7" are shown directed to a corresponding terminal block 150 in FIG. 2A which, in turn, extends the signals in an eight line lead array 152 to the A ports of a type 74LS241 latch 154. Each of the leads within array 152 is shown coupled to +5 v supply through a corresponding array of pull-up resistors represented by block 156. Latch 154 is coupled to +5 v vi line 158 which is filtered from line 160 and capacitor C7 and provides a corresponding latched output at its Y terminals via lead array 66. Thus, in the general operation of keyboard scanning, select voltage signals sequentially are applied to the 16 column leads of keyboard 18 from decoders 108 and 110 and the sensing of a switch closure representing a key actuation then is developed at lead array 152 and latch 154. Upon the detection of a key actuation, the microprocessor 60 addresses EPROM 74 for the unique key code corresponding therewith. That code then is accessed and latched at latch 90 for insertion in a ring buffer and transmission with a clock signal to the general purpose computer in accordance with a predetermined operational protocol.

In order for the microprocessor 60 to output the retrieved unique key code data to the general purpose computer which may, for example, be a model 8088 marketed by Intel Corporation, the start-up and transmission protocols of the latter device must be accommodated for. The outputs which are used in this endeavor extend from ports P3.0 and P3.1 which are shown connected with respective lines 170 and 172. Line 170 carries key code data and is correspondingly labeled "DATA". Of importance, however, the transmission of the unique key code by microprocessor 60 is carried out in conjunction with the transmission of delimiter codes. As shown in FIG. 2B, line 170 extends to an input of a type LS125 buffer 174 and thence via lines 176 and 178 to a keyboard output port or terminal 180. Line 178 also is coupled with +5 v through a pull-up resistor R1. The output directed to the general purpose computer is shown as labeled "KBO DATA". The general purpose computer also requires the presence of a clock signal which is provided from microprocessor 60 at line 172, shown labeled carrying the signal "DCLK". This signal is directed via line 172 to an input of another type LS125 buffer 182, the output of which at line 184 is coupled to line 186 extending, in turn, to keyboard output port or terminal 180. As before, line 186 is coupled through a pull-up resistor R2 to +5 v supply. The opposite inputs to buffers 174 and 182 are seen to be coupled to ground through lines 188 and 190.

A third output of the microprocessor 60 involved in the transmission of unique key code and protocol data is provided from a keyboard enable signal developed and transmitted from port P3.5 and line 192. This signal, labeled "KBI ENABLE" is directed via the latter line to the input of another type LS125 buffer 194, the opposite input thereto at line 196 being coupled to ground. The output of buffer 194 is directed to the energizing inductive winding of a relay represented at block 198 which is shown powered from +5 v supply via line 200. Relay 198 incorporates a normally closed switching function identified at S1 which is connected between lines 202 and 204. Thus upon the energization of the winding of the relay, switch S1 is opened to enable the transmission of data from microprocessor 60 port P3.1 and through line 178 and keyboard output port or terminal 180. Such transmission takes place in synchronsim with the transmission of a predetermined clock frequency signal from line 186 (KBO CLK). This dual transmission is an operational requirement of the general purpose computer as it controls and reacts with a conventional computer keyboard. Output port 180 is seen additionally to receive a +5 v power supply from the general purpose computer which is distributed as above discussed and such distribution is represented by line 206. Initial filtering of this source at line 206 is provided by capacitor C8 coupled between line 206 and ground. Additionally, as represented at line 208, a ground is supplied from the general purpose computer. Finally, a reset function may be asserted from the general purpose computer through the port 180 and line 210 as labeled "KBO RESET". The reset command emanates from the general purpose computer and, tracing the signal carrying line 210 to FIG. 2A, the signal may be seen to be asserted from that line through line 212 to one input of a type LS125 buffer 214. The opposite input to the buffer 214 is coupled via line 216 to ground, while the output thereof is directed along lines 218 and 220 to the base of PNP transistor Q1. Line 218 extends further to include resistor R2, capacitor C9 and resistor R3 extending to ground. This line also is intersected by line 222 incorporating resistor R4 which is coupled between the collector of transistor Q1 and the rest terminal (RST) of microprocessor 60. The emitter of transistor Q1 is couple to line 218 intermediate resistor R2 and C9. With the arrangement shown, an avoidance of spurious signals is provided through a verification approach wherein a valid reset signal functions to sufficiently charge capacitor C9 to draw transistor Q1 into conduction and assert the reset signal along line 222.

Returning to FIG. 2B, the keyboard output port 180 functions as an interface between the general purpose computer, the microprocessor 60 and the computer or typewriter type keyboard 46 described in FIG. 1. For the microprocessor 60 to communicate with this general purpose computer, it is called upon initially to respond to the general computer inputs at start-up. This response requires that it acknowledge a low-going signal KBOCLK at terminal 180 and line 186 by the transmission of an (hex)AA responding or acknowledging signal. Such a protocol is generally required of all keyboards by general computer software architecture. The transmission of unique key code data from the terminal 180 as keyboard data signals requires the earlier-noted synchronized transmission of clock signals from line 178. These signals are derived from port P3.0 and line 172 at microprocessor 60. An input monitoring of the KBOCLK signals and KBODATA signals on the part of microprocessor 60 is achieved by an input of the KBOCLK signal via lines 184 and 223 to the P3.3 terminal of the microprocessor and via lines 176 and 224 supplying the KBODATA signal to the P3.4 terminal.

In order to establish a workable protocol between the operation of the cash register specific keyboard 18 and the typewriter or computer oriented keyboard 46 as shown in FIG. 1, the latter keyboard operation is prioritized. Looking to FIG. 2A, a keyboard input terminal block is represented at 226 which is provided within computer housing 14 to receive the cable connection 48 from typewriter keyboard 46. Thus, the typewriter keyboard 46 is provided +5 v supply from line 206 (FIG. 2B) through line 228 which supply is filtered by a capacitor C10 coupled thereto to ground. Additionally, the ground input derived from the general purpose computer and distributed from line 208 is asserted to terminal block 226 from line 230. Thus arranged, the typewriter keyboard 46 may transmit an appropriate clock signal (KBI CLK) along from terminal block 226 along line 232 in conjunction with keyed data as signal KBI DATA through line 204. The keyboard 46 also is arranged to respond to reset signals as asserted from line 210. Pull-up resistors R5 and R6 are coupled between respective lines 204 and 232 to +5 v.

With the arrangement shown, the switching function S1 of relay 198 normally will be closed. Upon operator use of keyboard 46, clock information will be transmitted along line 232 in conjunction with data along line 204. As the clock signal is inserted to line 232, as revealed in FIG. 2B it is monitored from lines 184 and 222 leading to port P3.3 of microprocessor 60. The microprocessor 60 reacts to this input and does not energize the inductive winding of relay 198. Additionally, the clock signal is seen to pass through a type LS125 buffer 234 which is selectively activated from line 236 and keyboard enable line 192. During periods when the protocol permits transmission of unique key codes from the keyboard 18, then the buffer 234 is enabled and forms a block facilitating the transmission of the DCLK signal from line 184. Under the protocol prioritizing the receipt of transmissions from the typewriter-type keyboard 46, the microprocessor 60 continues to carry out a keyboard 18 scanning regimen and accessing of unique key codes from EPROM 74. These accessed key codes are maintained during such intervals in a ring buffer as is described in more detail later herein. At such time then as the typewriter keyboard 46 is not in use, the microprocessor 60 opens the switch function of relay 198 (opening the connection between lines 204 and 202), as well as asserts a blocking activity at buffer 234, whereupon it transmits the buffered or collected key code data with delimiter codes. This transmission can be quite rapid to the extent that it may occur between key actuations at keyboard 46 during operator use thereof.

Figure 4:
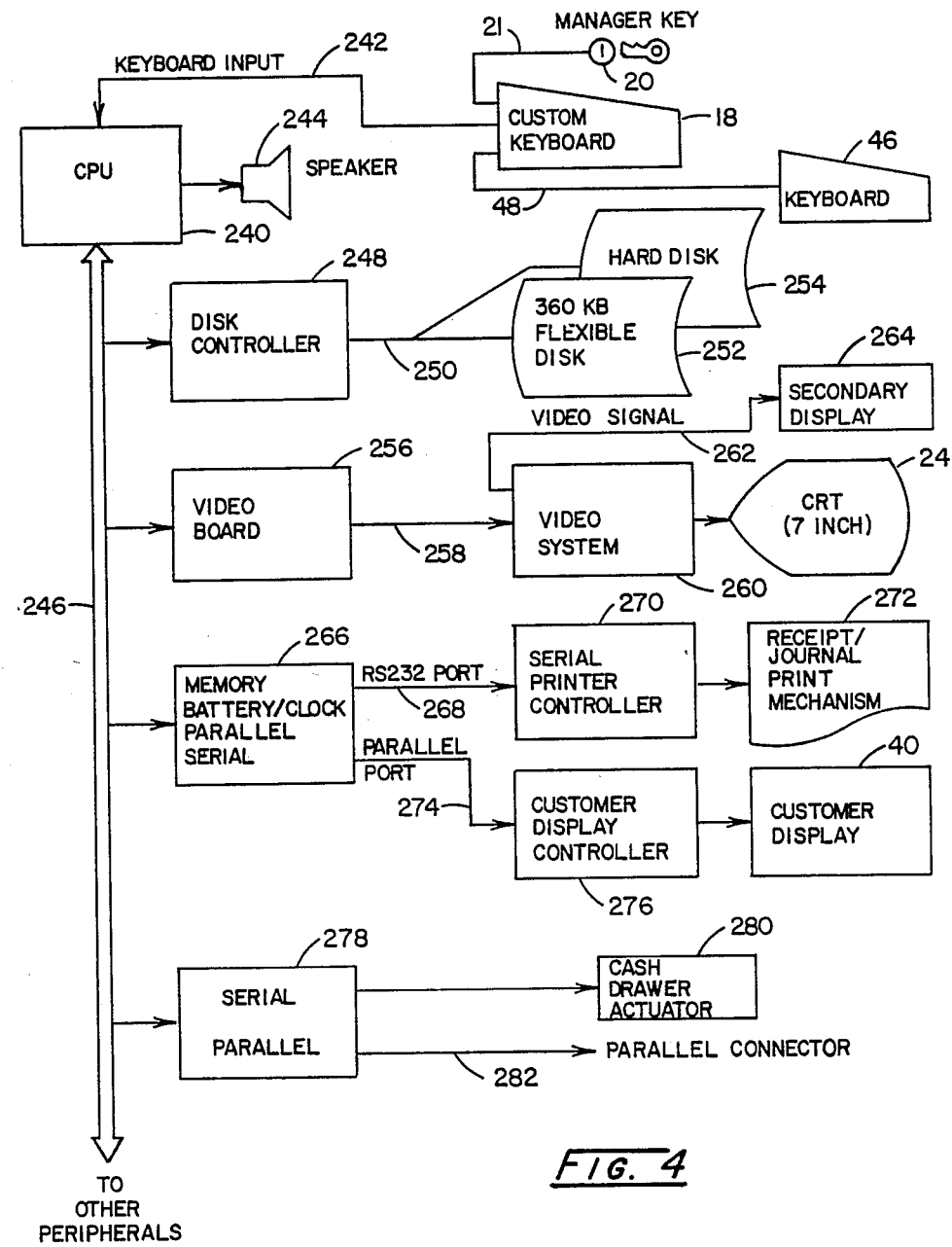
FIG. 4 is block schematic representation of the components of a general purpose computer employed with the apparatus of FIG. 1.

Turning to FIG. 4, the basic components employed with the general purpose computer (CPU) as operating within apparatus 10 are revealed in schematic fashion. The computer as represented at block 240, employs, for example, a type 8088 microprocessor marketed by Intel Corp. CPU 240 is shown having a keyboard input from line 242 emanating from the custom keyboard, again represented schematically at 18. It may be observed that keyboard 18 also functions in conjunction with a typewriter or conventional computer keyboard 46 as described in FIG. 1. The daisy chain interconnection between keyboard 46 and keyboard function 18 again is represented by cable 48. Additionally, the manager key 20 input is shown extending to the keyboard 18, via line 21. CPU 240 may incorporate a speaker for audible prompts and the like as represented at 244 and is shown having a conventional bus interconnection 246 to which a variety of "peripherals" including associated control cards may be interconnected. In this regard, the device will contain a disk controller function as represented by block 248 which, as represented by line 250 may operate a flexible disk memory as represented at 252 and, additionally, hard disk memory is represented at block 254. Bus 246 also provides communication with a video generator circuit as represented by the "video board" block as at 256 the output of which at line 258 is shown directed to a video system represented at block 260 which functions to drive, for example, a 7 inch cathode ray tube (CRT) as described in conjunction with FIG. 1 at 24. The type video system which may be employed may be, for example, a type MD1500 series marketed by Motorola, Inc. of Schaumburg, Ill. The signal developed by the video system represented at block 260 may, as represented by line 262 and block 264 provide a secondary monitor output or else drive a VCR type device. In the former regard, the TV monitor may be positioned, for example, in the kitchen region of a fast food establishment such that the requested items of food may be displayed to the cook at the time the sale is made in conjunction with the POS apparatus. Such flexibilty of operation is achieved through employment of the general purpose computer in conjunction with the point of sale apparatus.

The bus 246 also is shown communicating with a memory battery and clock as well as parallel and serial port functions as shown at block 266. The RS232 port output from this function as represented at line 268 may be employed to provide an operation output to a serial printer controller as represented at block 270 which, in turn, provides a printed receipt and journal from a printing mechanism represented by block 272. This feature is described in general at 30 in FIG. 1. The parallel port structure of the CPU system may be employed as represented a line 274 to feed a customer display controller represented at block 276 which, in turn, drives a customer display as described earlier at 40 in FIG. 1. Such a display and controller may be Provided, for example, as an M Series Liquid Crystal Dot Matrix Display Module marketed, for example, by Seiko Instruments, USA, Inc., Torrance, Calif. Finally, the serial and parallel ports of the CPU as represented at block 278 may be employed to provide an operation output to a cash drawer actuator as represented at block 280 as well as provide a parallel connector output shown at line 282 which may provide any of a number of functional uses depending upon the requirements of the individual establishment. As labeled, the bus structure 246 can accommodate a broad variety of peripherals as required by the establishment user.

Figure 5:
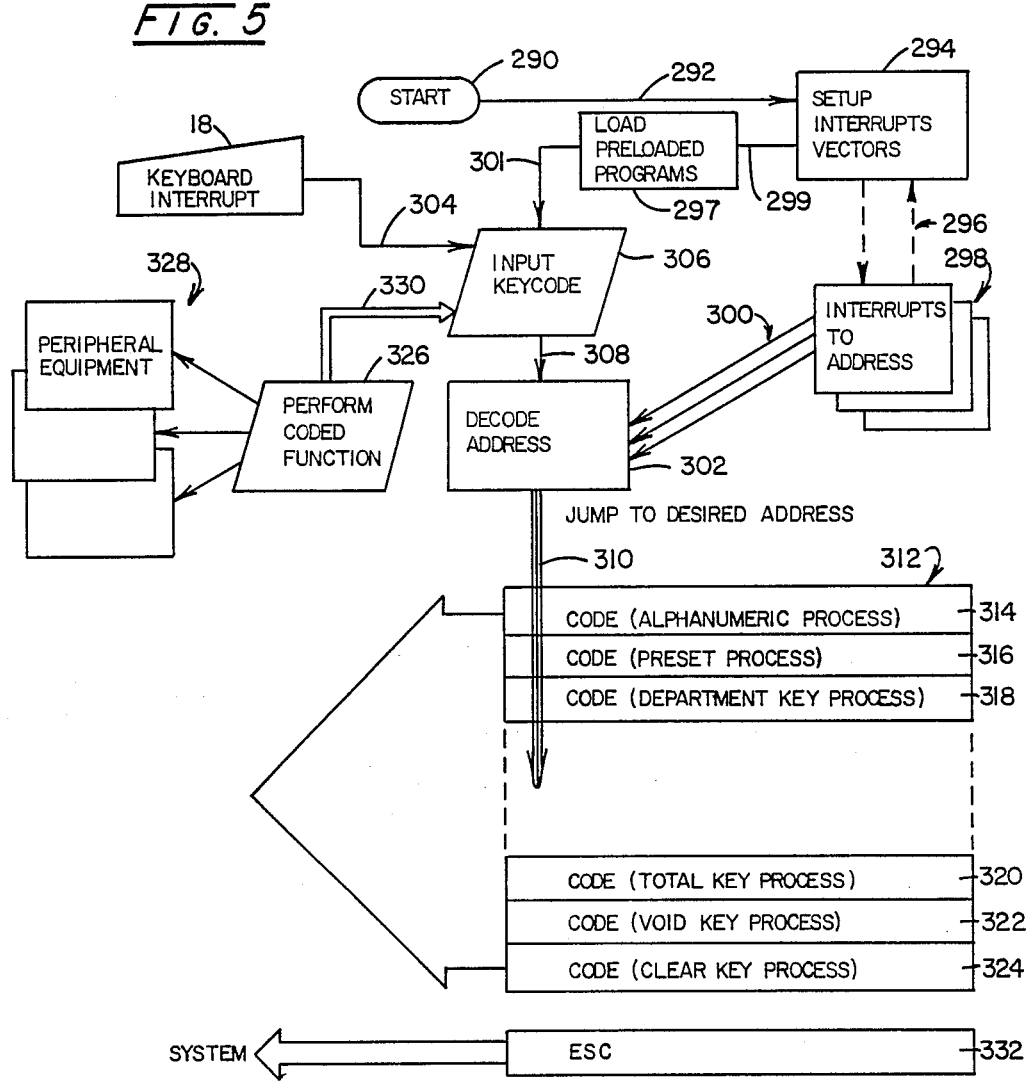
FIg. 5 is a block schematic diagram of the operating system of a general purpose computer described in conjunction with FIG. 4.

The highly desirable fast response to actuation of the keys of keyboard 18 which the POS apparatus 10 is capable of achieving is developed by a particular structuring of the operational system of CPU 240. Generally that operational system will incorporate a memory retained interrupt structure which is prioritized. Interrupt operations provide for a direct transfer of control to a desired program location. For the type 8088 microprocessor described above, a 256 element table containing address pointers to the interrupt service program locations is evolved. The basic input-output system (BIOS) locations of the table incorporate initialization procedures followed by an interrupt to service the time-date clock of the computer. The next interrupt level in the system is typically provided as a "keyboard handler" to respond to inputs from a conventional keyboard. Following other select interrupt locations in the BIOS area of memory, the memory then at lower priorities contains an applications area where servicing of the bus structure, communications, mass storage video and the like may occur. With the present invention, a vector interrupt identified as a device driver program is substituted for the keyboard handler interrupt in the high priority BIOS region of memory. The keyboard handler program itself then is written at a higher level interrupt location within the lower priority applications area of memory. With such an arrangement, when a unique code is transmitted from the keyboard 18 in conjunction with transmitted delimiter codes, the system immediately interrupts to execute the memory retained program associated with the particular key code. This procedure is generally revealed in FIG. 5. Looking to the latter figure, the start-up of the technique is represented at node 290 which leads, as represented by line 292, to the setting up or loading of the interrupt vectors as represented at block 294. This loading will take into consideration the appropriate prioritization of the interrupts, that representing an actuation of the key from the point of sale device 10 keyboard 18. This represents the second level of 255 available levels within the BIOS region of memory. Typical ones of these interrupt locations are represented by the dashed arrows shown generally at 296 and the block grouping 298. After setting up interrupt addresses, programs are loaded at these addresses as represented by lines 299 and 301 in conjunction with block 297 (see block 312). Line 301 waits for an interrupt from keyboard 18 via line 304. Upon the occurrence of an interrupt, as represented at line grouping 300, the interrupt address will be decoded as depicted at block 302. With the presence of a keyboard 18 input as represented again at block 18 in conjunction with line 304, the resultant inputted key code as represented at block 306 is decoded as represented at line 308 and block 302. From block 302, the system jumps to the address represented by the unique key code and the memory retained instructions at that address will vary in accordance with the desires of the operator. For example, access to this programmed region of memory is represented at arrow 310 leading to a generalized representation of a memory region as shown at 312. The instructions within BIOS memory for example may include developing an alpha-numeric process corresponding with the key pressed as shown at location 314. Additionally, certain of the keys may be designated having a preset process as shown at location 316. Exemplary of such keys would be the identification of a particular kind of food or the like ordered. Location 318 shows a department key process which identifies the particular sub-function of the retail outlet from which the goods were purchased. As is apparent, a broad variety of this form of keying may be provided. The memory also will contain a totalling program as representing at location 320; a voiding process as indicated at location 322 and a clear process as represented at location 324. As these sub-routines are performed as represented at block 326, peripheral equipment such as visual readout printers, cash drawers and the like are called upon to perform as represented at block grouping 328. Feedback from these peripheral operations to the system are represented at arrow 330.

To cause the CPU 240 to assume normal computational duties, for example carrying out inventory evaluation, accounting and the like, an escape procedure is provided for restructuring the system as represented at block 332.

Figure 6:
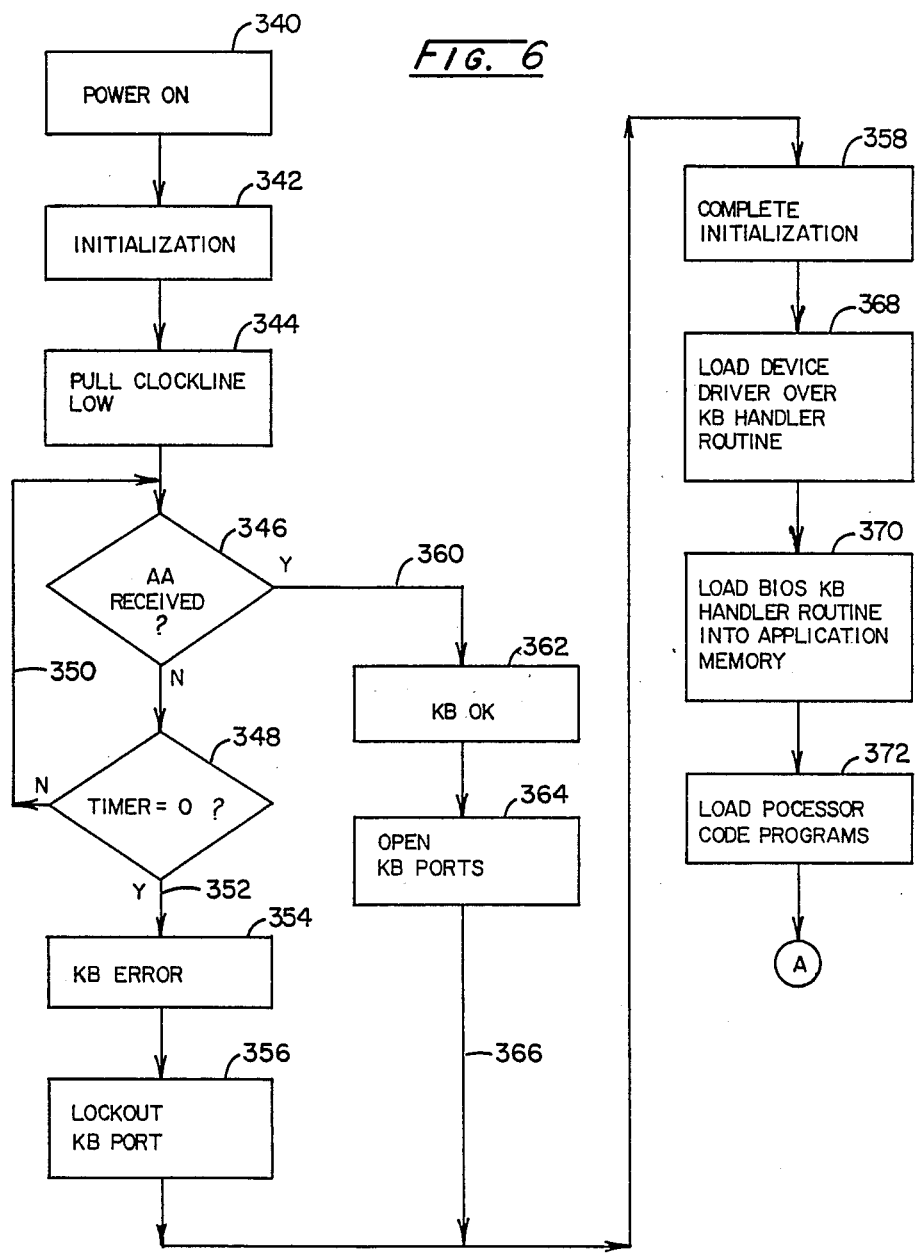
FIG. 6 is a flow chart representing certain start-up routines of the general purpose computer employed with the apparatus of FIG. 1.

Turning to FIG. 6, a flow chart representation of the program which the CPU 240 undergoes in starting up for interaction with the POS approach at hand is revealed. At the commencement of operations, power is applied to the computer as represented at block 340. The computer then undergoes a sequence of initialization procedures as represented at block 342. These procedures are retained in BIOS and will involve the checking of all peripheral equipment to determine its presence and workability. At a point in time during this initialization procedure, the processor will look to the status of the keyboard peripheral. The instant flow chart is expanded in the latter regard. For example, in developing a keyboard check, as shown in block 344, the KBOCLK line as described in FIG. 2B at line 186 is pulled to a logic low condition. At this point a timer is set within the CPU 240 and, as represented at decision block 346, the system awaits receipt of a series of 16 on-off pulses which appears logically to the program as a (hex)AA signal from the keyboard. As described earlier, this signal will be sent from the microprocessor 60 as the latter device detects the low logic level at line 186. The CPU 240 waits a predetermined time developed by the count-down of a timer as represented by the decision block 348 and loop line 350. If a time-out occurs and no (hex)AA signal is received, then as represented at line 352 and block 354, the processor 240 indicates a keyboard error and, as represented at block 356, the device blocks out and thereafter ignors any signals at the keyboard port. As represented at block 358, the processor 240 then completes initialization.

In the event that the evaluation at inquiry block 346 is affirmative, then as indicated by line 360 and block 362, a determination is made that the keyboard is functional and, as represented at block 364, the keyboard ports are opened for an input or output designated performance. In the latter regard, the term "designated" is employed inasmuch as the ports may operate in alternate input or output fashion. The program then continues as represented by line 366 and block 358 to complete the initialization operation. The computer then loads all of the programs which are necessary to determine port activity as represented at block 368. As represented in the latter block, of particular import to the instant invention, the "device driver" program is loaded over the keyboard handler routine normally located at the second priority location in BIOS. As represented at block 370, the program then proceeds to load the keyboard handler routine normally retained at the second level of priority in BIOS into the application region of memory, a level therein of lesser priority. Then, as represented at block 372, the sequence of code programs for carrying out the instructions represented by the key codes are preloaded at predetermined applications region memory address positions out of the BIOS region of memory. The program then monitors the system for keyboard activity in a priority protocol only superceded by the updating of the clock of the system. Node A, following block 372 is seen reproduced in FIG. 6A. Looking to that figure, the noted monitoring of keyboard activity is represented by the inquiry at block 374. As represented by loop line 376, where no keyboard activity is present, then the system returns as represented at block 378. However, where keyboard activity is detected, then as represented by inquiry block 380, a determination is made as to whether the keyboard at hand is that described in conjunction with FIG. 1 at 18, the cash register specific keyboard. The determination as to whether that particular keyboard is communicating is carried out with respect to the presence or absence of a delimiter code at the beginning and ending of the unique key code transmitted under the direction of microprocessor 60 (FIG. 2A). Where the delimiters are not present, as represented by line 382 and block 384, the program then jumps to the keyboard handler program earlier loaded at the application region of memory and proceeds to carry out a normal keyboard operation, albeit at a lower priority level in memory. The program then, as represented at line 386, returns as represented at block 378.

In the event that the delimiter codes are present with the transmitted key code, then the cashier keyboard is active, and the response to the inquiry at block 380 is in the affirmative as represented by line 388 and block 390.

Figure 6A:
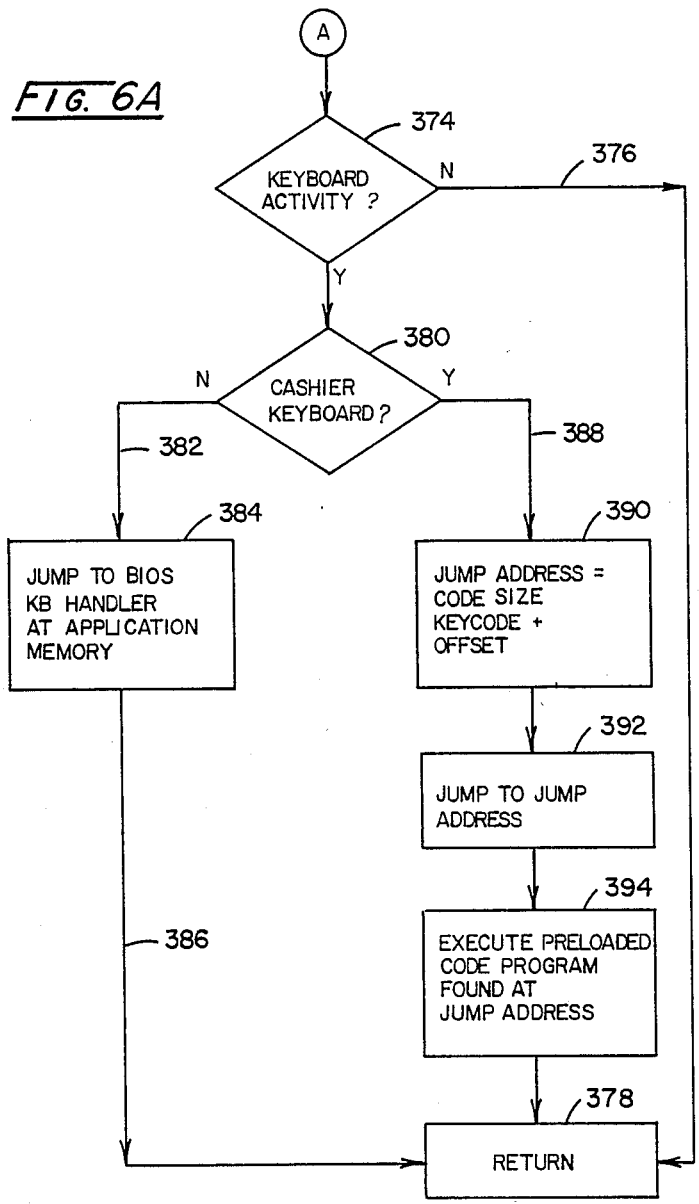
FIG. 6A is a flow chart showing a device driver routine employed in conjunction with the program of FIG. 6.

In the latter block, the unique key code is treated to determine a jump address. This may be through a multiplication-addition process wherein the key code is multiplied by a code size factor and an offset is added to develop a jump address. Alternately, a table value of the key code as described earlier in FIG. 5 at block 298, may be accessed for this purpose based upon the key code value. The jump address is the location of the preloaded code which is to be executed. Accordingly, as represented in block 392, as also described in conjunction with line 310 in FIG. 5, the instructions then provide for a jump to the devised jump address and, as represented at block 394, the preloaded code program found at that jump address then is executed. As represented at block 378, the device drive program then is returned. In effect, the program or routine represented in FIG. 6A is a vector interrupt having a very high priority which achieves an execution of a key code input very rapidly to overcome the disadvantages heretofore encountered with the application of a general purpose computer to a cash register function. As noted above, these preloaded programs can carry out any of a broad variety of cash register functions including the opening of a cash drawer; displaying information on a monitor or customer display provided as an LCD data can be transmitted out of the apparatus 10 through a modem connection and a broad variety of calculations can be carried out. Further, escape procedures can be carried out with this technique to reload a whole new sequence of code programs. With the latter arrangement, the restructured programs can change the function of the point of sale apparatus 10 for example from a cash register to a receiving terminal associated with inventory control.

Now considering the functioning of the microprocessor 60 in conjunction with the cashier type keyboard 18, it may be observed that the microprocessor functions to create key codes which, without more, represent to the CPU 240 inputs from any conventional computer keyboard. Thus, the CPU 240 will accept these codes in conjunction with the standard protocol of communication between it and a conventional keyboard. However, as noted above, the key codes themselves are unique in carrying what in effect is jump address data, as well as identifying delimiters identifying this unique function. Of course, the CPU 240 will respond in fully normal fashion with inputs from the computer-typewriter type keyboard 46 (FIG. 1).

The overall program approach employed with microprocessor 60 and its associated memory 74 (FIGS. 2A-2B) is one, where following initial power-up of the system, the keyboard 18 is initialized and all variables as well are initialized for the system. The program scans for closures of the switches actuated in conjunction with keyboard 18 and, when such a switch closure is detected, the corresponding unique key code is accessed and positioned in the ring buffer, whereupon a determination is made as to whether there is activity on the clock line 232 deriving from terminal block 226 (FIG. 2A). If that is the case, then the auxiliary keyboard 46 is in use and is given priority. If the latter condition is not the case, then the accessed unique key code, now in buffer, is transmitted. In the event that there is activity at line 232, then the unique key code is retained in the buffer arrangement and the keyboard 18 continues to be scanned for key activity.

Figure 7:
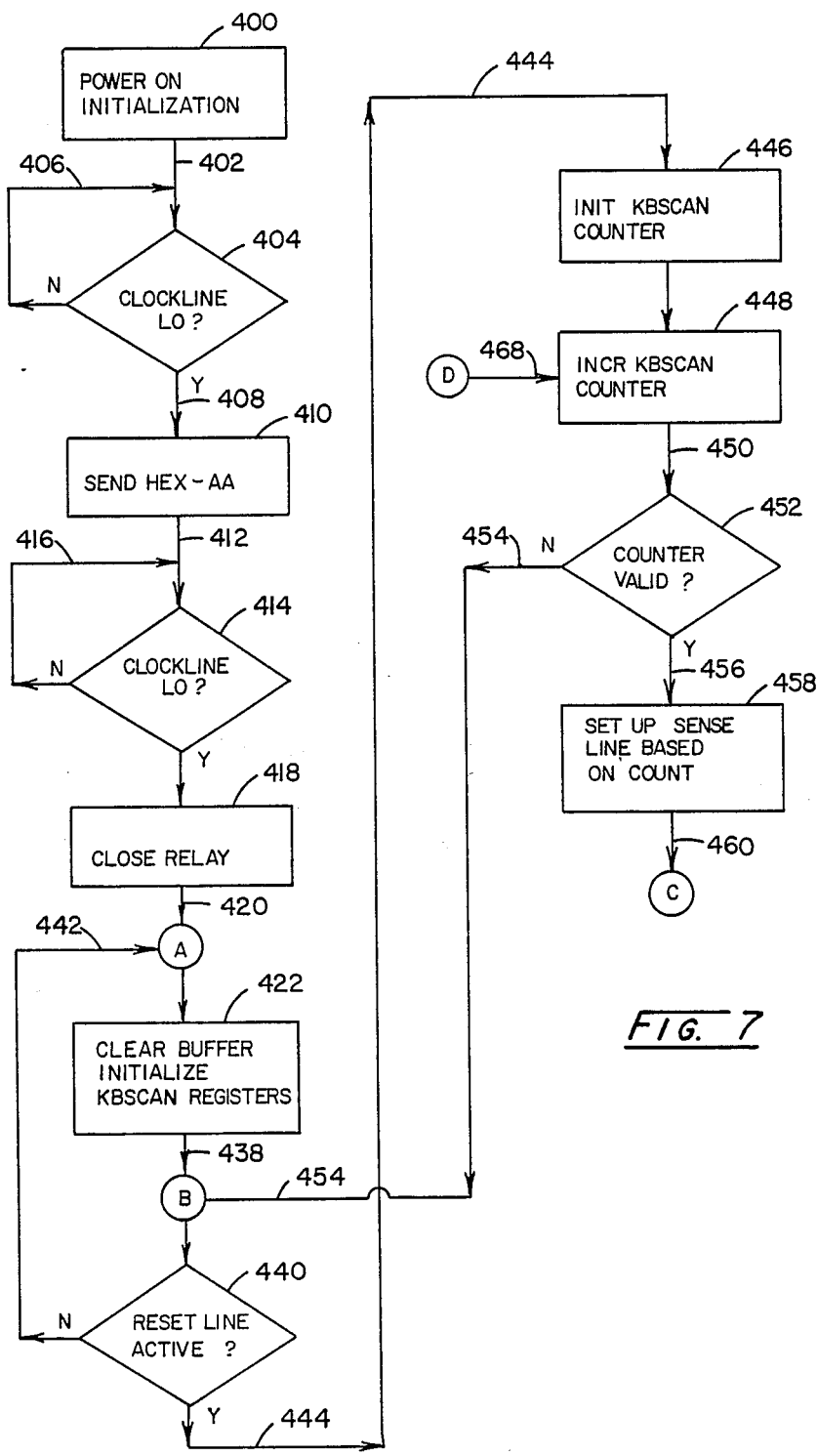
FIG. 7 is a flow chart showing initialization and keyboard scanning techniques employed with the microprocessor components of the apparatus of FIG. 1.

Looking to FIG. 7, a more detailed diagrammatic representation of the procedure at hand in keyboard 18 is presented. The power on-initialization procedure is represented at block 400 representing the power on-initialization procedures as above described which are conventional. As represented at line 402 and decision block 404, a determination is made then as to whether the clock line 186 (FIG. 2B) has been drawn to a logic low value by the CPU 240. If that is not the case, a wait condition obtains as represented by loop line 406. Where the clock line 186 is low, then, as represented at line 408 and block 410, the microprocessor 60 transmits a (hex)AA signal via line 178 which is information for the CPU 240 indicating that a keyboard is coupled thereto as one of its peripherals. The program then proceeds as represented by line 412 and decision block 414 to determine whether the clock line 186 remains low and if it is not, then a wait state ensues as represented by loop line 416. In the event that the clock line is low following the sending of the hexAA code, then, as represented at block 418, switch S1 of the relay 198 is closed to provide a preference for any activity from the auxiliary keyboard 46 (FIG. 1). The program then proceeds, as represented by line 420 incorporating node A, to the instructions at block 422. This is the entry into the primary program for the microprocessor 60 and involves the clearing of the buffers and the initialization of the keyboard scan registers.

Figure 8:
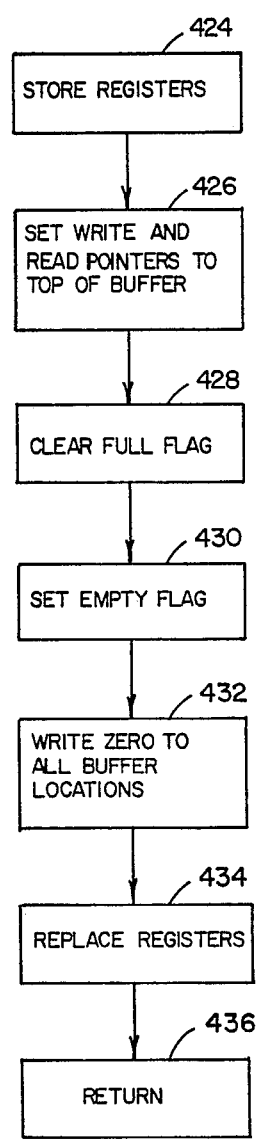
FIG. 8 is a sub-routine employed with the program represented in flow chart fashion in FIG. 7.

Looking momentarily to FIG. 8, the flow diagram representing the instructions effecting clearing of the buffers is set forth. As represented at block 424, all of the register information is stored. This information constitutes data required for the operation of the program. As represented at block 426, the write and read pointers are set at the top of the buffer, following which, as represented at block 428, the buffer full flag is cleared or set to zero. Similarly, as represented at block 430, the buffer empty flag is set as an indicator that the buffer is empty. The sub-routine then progresses to block 432 which provides for writing zeroes to all buffer locations, following which, the earlier stored registers are replaced as represented at block 434. The sub-routine then returns to the primary program as represented at node 436. This clear sub-routine may be employed additionally in response to a reset input from the CPU 240.

Figure 9:
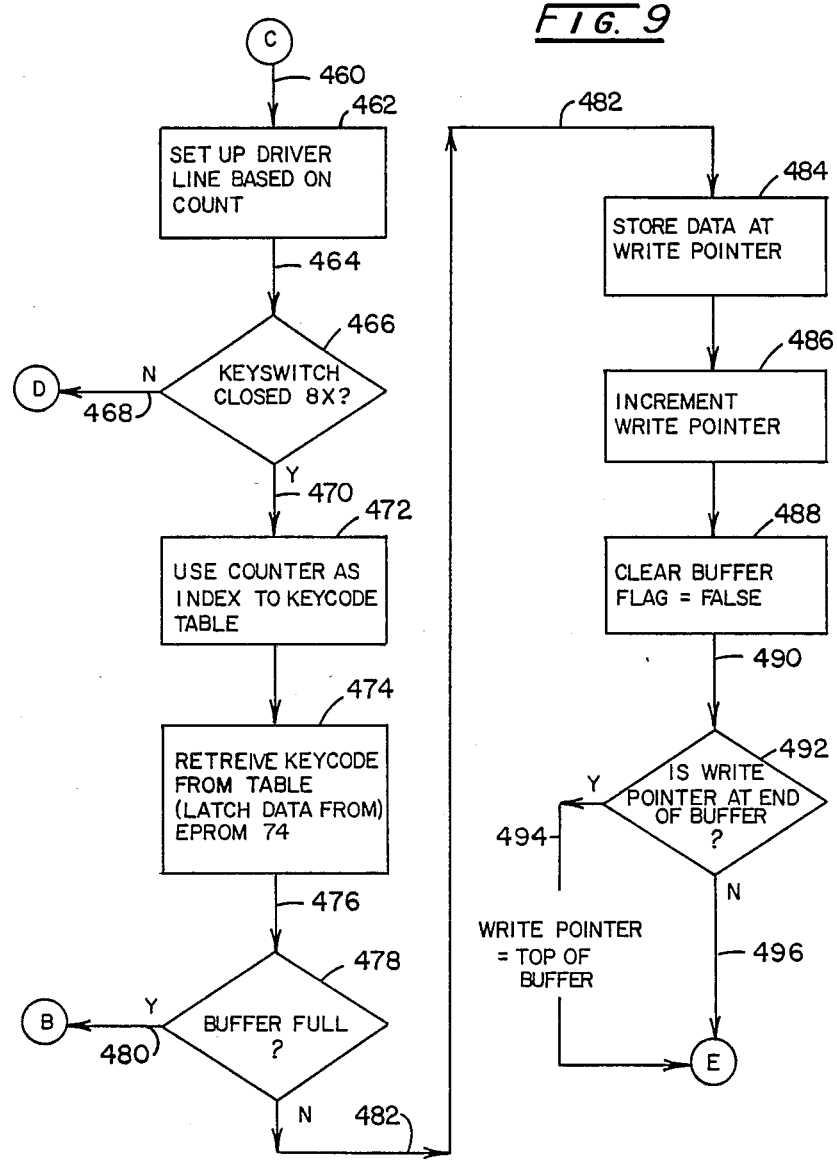
FIG. 9 is a program flow chart showing a continuation of the program represented in FIG. 7.

Returning to FIG. 7, the program continues as represented at line 438 containing node B to the inquiry represented at block 440 where a determination is made as to whether the reset line 210 (FIG. 2B) is active. In the event that it is, then as represented by loop line 442 the program returns to node A wherein the clearing sub-routine is carried out and initialization of the keyboard scan registers is provided as represented at block 422. Where the reset line 210 is not active, then as represented at line 444 the program may commence a keyboard 18 scanning routine. This routine commences with the initialization of the keyboard scanning counter represented at block 446, following which an incrementation of that counter occurs as represented at block 448. The routine then progresses as represented at line 450 and decision block 452 to determine whether the counter position is within a valid range. If it is not, then as represented by loop line 454, the routine returns to node B to carry out initialization of the keyboard register and incrementation procedures once more. In the event of an affirmative determination with respect to the counter as determined in connection with block 452, then as represented at line 456 and block 458 the routine sets up a given sense line (KBSENSE 0-7) and this identified line from array 152 is latched into a sensing condition by latch 154 (FIG. 2A). As represented at line 460 and node C extending to FIG. 9 and block 462, corresponding set-up is carried out with respect to the keyboard driver lines, i.e. the columns, such that an appropriate logic high signal (KBM 0-15) is developed in conjunction with the elected count. This condition is latched in conjunction with an appropriate decoder 108 or 110. The program then continues as represented at line 464 to determine whether or not a key closure has been determined with respect to the sense lines at array 152 (FIG. 2A). In this regard, as represented at decision block 466, a debounce condition is evaluated by making this determination eight times. If the key switch closure condition is not continually observed in eight repetitions, then as represented by loop line 468 and node D extending to FIG. 7, the program returns to increment the keyboard scan counter 448 to carry out the procedure for a next column and row polling orientation. Thus, the keyboard is continuously scanned until such time as activity is detected and evaluated.

When a debounced key switch closure is sensed, the counter is used again to index to a key code table as represented at line 470 and block 472. Then, as represented at block 474, the unique key code is retrieved from the table (EPROM 74) and is latched in conjunction with latch 90 (FIG. 2B).

The program then progresses as represented at line 476 to the inquiry provided at block 478 wherein a determination is made as to whether the buffer is full. For general applications, the buffer will retain about 32 keystroke components of information. If the buffer is full, then as represented by line 48, the program returns to node B to reinitiate the keyboard scanning procedure and the previously retrieved key code is ignored. Where, as generally is the case, the buffer is not full, then as represented at line 482 and block 484 the data are stored at the location of the write pointer, i.e. the numerical indication of the position to write to. Following such storage procedure, as represented at block 486, the write pointer is incremented to its next position and, as represented at block 488, the clear buffer flag is set to false inasmuch as the buffer is not full and holds the data previously inserted. The program then proceeds as represented at line 490 and inquiry block 492 to determine whether the write pointer is at the physical end position of the buffer. If the determination is in the affirmative, then a represented by line 494, the write pointer is set at the top of the buffer and the program continues as represented by node E. Similarly, in the event of a negative response in connection with the inquiry at block 492, as represented at line 496, the program continues.

Figure 10:
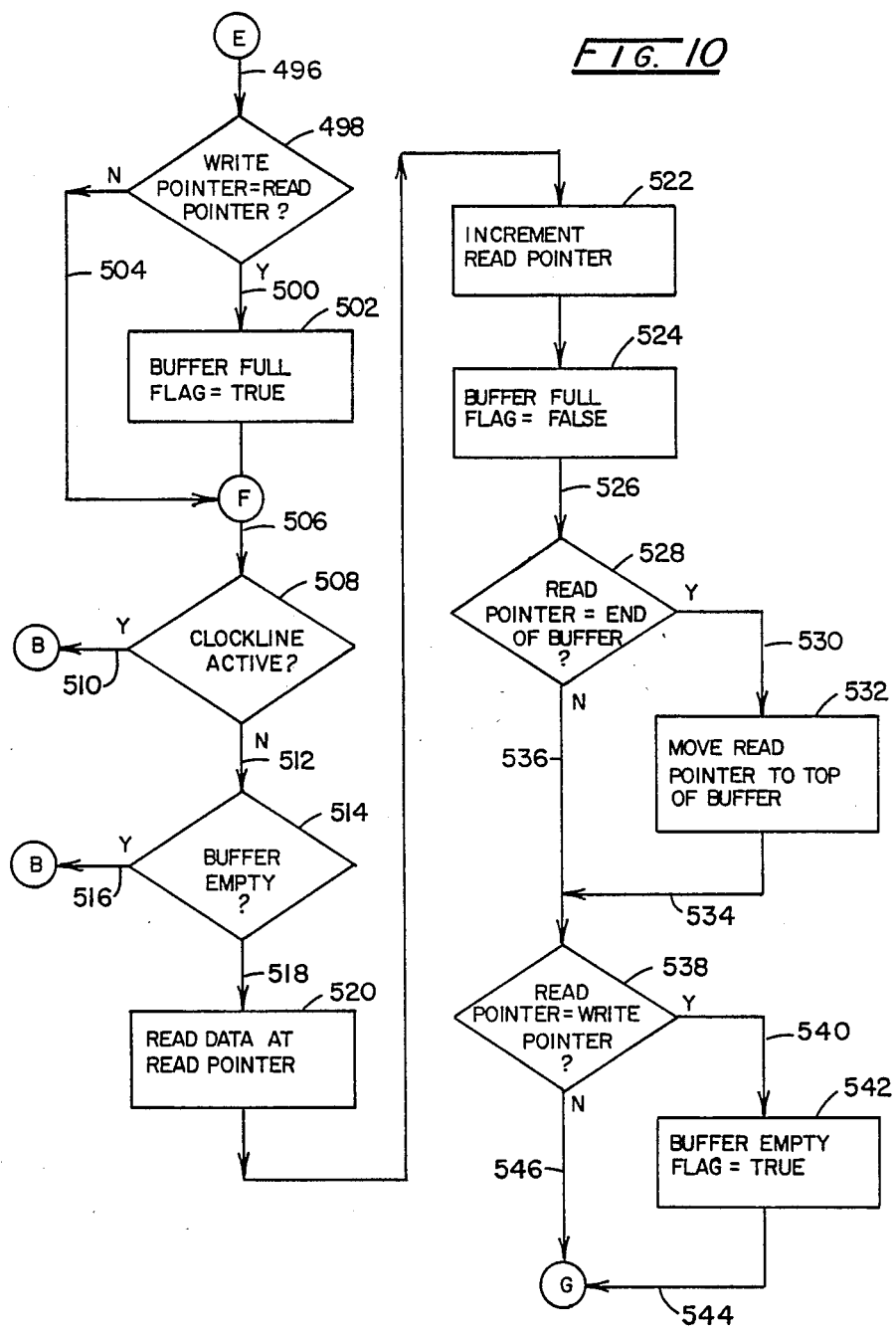
FIG. 10 is a flow chart showing a continuation of the program represented in FIG. 9.

Looking to FIG. 10, node E and format line 496 are reproduced and shown leading to the inquiry represented at block 498 wherein a determination is made as to whether the write pointer equals or coincides with the read pointer. In the event that there is coincidence, as represented at line 500 and block 502, the result is that the buffer is full and the buffer full flag is set to a true condition. In the event that the coincidence determined with respect to the inquiry at block 498 is not present, then as represented by line 504 the buffer is not full and the program continues as represented by line 506 containing node F to a determination as to whether the clock line is active as represented at block 508. This is the activity at line 232 which is monitored by microprocessor 60 to determine whether there is activity with respect to keyboard 46. If a determination is made that the line 232 is active, then, as represented by line 510 and node B, no transmission of unique key code data is made and the program returns to node B at line 438 as shown in FIG. 7 to continue keyboard scanning activities. Where the clock line 232 is not active, then as represented at line 512 and inquiry block 514, a determination is made as to whether the transmit buffer is empty. In the event that it is, as represented by line 516 and node B, the program returns to corresponding node B at line 438 as shown in FIG. 7 and carries on a key bit board scanning activity once more. The inquiry at block 514 is established such that the system can terminate at this point at the end of a given transmission. In the event that the buffer is not empty, then as represented at line 518 and block 520, the data at the read pointer location are read and as represented at block 522, the read pointer then is incremented. The routine then proceeds to set the buffer full flag to a false designation as representing at block 524, inasmuch as a character is being transmitted. The routine then progresses as represented at line 526 and block 528 to determine whether or not the read pointer is at the end of the buffer. In the event that an affirmative determination is made, then as represented at line 530 in block 532, the read pointer is moved to the top location in the buffer. The program then progresses as represented at lines 534 and 536. Correspondingly, if the read pointer is not at the end of the buffer, the program continues as represented by the same line 536 to the inquiry represented at block 538 wherein a determination is made as to whether the read pointer equals or is coincident with the write pointer. An affirmative determination with respect to this inquiry is a representation that the buffer is empty and as represented at line 540 and block 542, the buffer empty flag is set to a true condition. The program then continues as represented at line 544 to line 546 and node G. Correspondingly, if the read pointer is not coincident with the write pointer, then the program continues as represented at line 546 and node G.

At this juncture in the routine, a character has been retrieved and the transmission procedure then ensues. Looking to FIG. 11, node G and line 546 are produced as extending to the instructions at block 548 providing for the opening of switch S1 of the relay 198. This functions to disconnect the auxiliary keyboard 46 from the output port. Then, as represented at block 550, a delimiter code is transmitted which provides initial information to CPU 240 that a unique key code will be undergoing transmission. Accordingly, as represented at block 552, this unique key code is transmitted following which, as represented at block 554, a following delimiter code then is transmitted. The program then functions to close the switch S1 function of relay 198 as represented at block 556. Then, as represented at line 558 and node F, the program returns to node F in line 506 as described in conjunction with FIG. 10 to again determine if the clock line is active and commence the transmission of a next key code.

Figure 11:
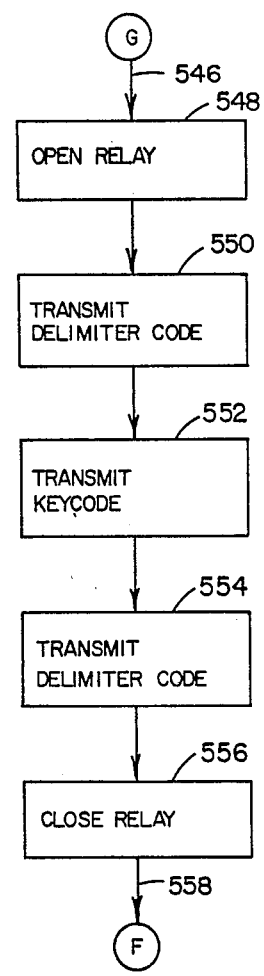
FIG. 11 is a flow chart showing a continuation of the program represented in FIG. 10.
Figure 12:
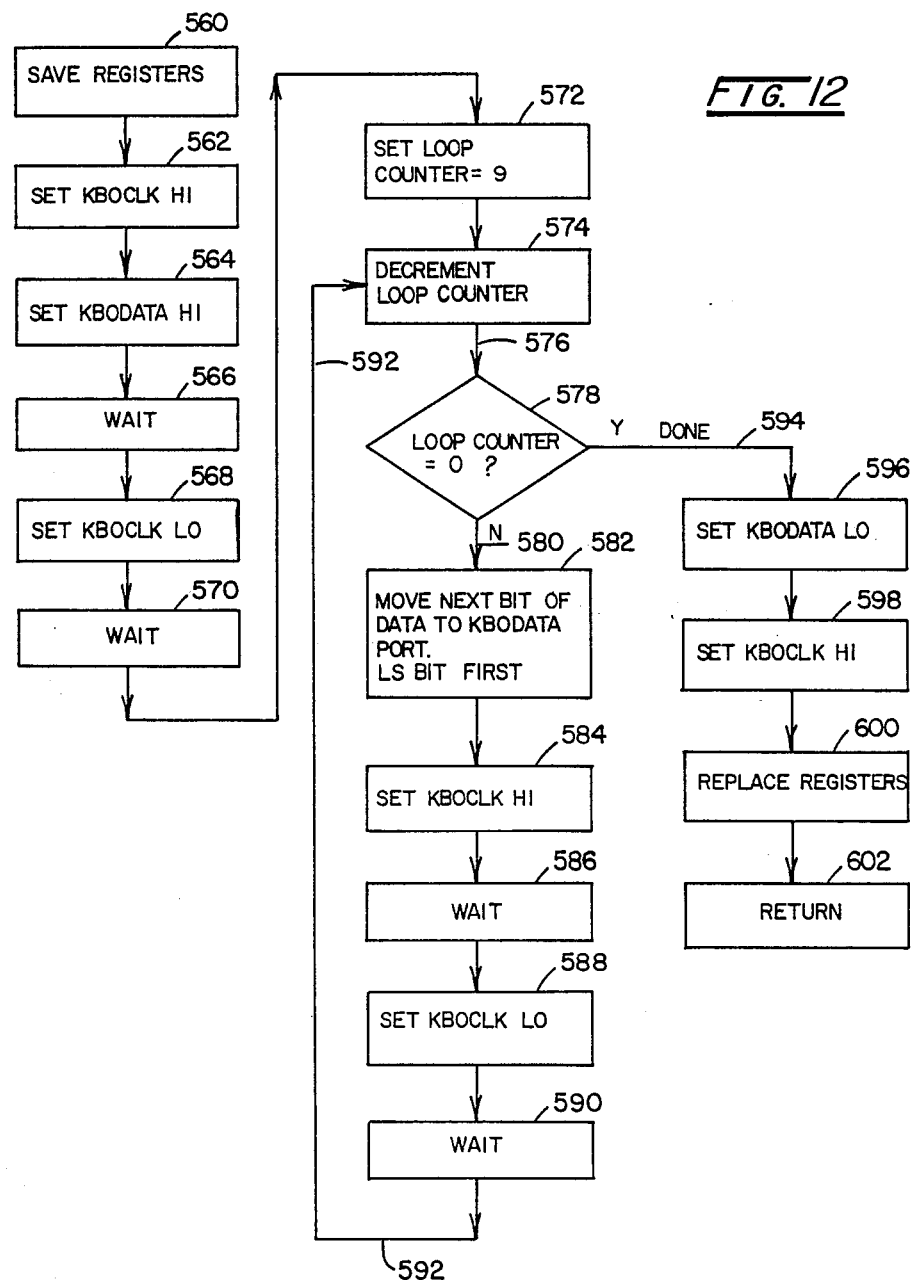
FIG. 12 is a flow chart showing a keyboard transmitting routine employed with the program represented by the flow chart of FIG. 11.

Turning to FIG. 12, the transmission procedure associated, for example with blocks 550, 552 and 554 of FIG. 11 is revealed. This transmission approach employs the serial port lines 178 (KBODATA) and clock output line 186 (KBOCLK) as described in conjunction with FIG. 2B. Looking to the program, it is seen to commence with the instructions at block 560 wherein the registers are saved and the program then sets the KBOCLK signal at line 186 to a logic high value. The routine then progresses to the instructions at block 564 wherein the KBODATA signal is set to a logic high value as developed from line 178. Then, a wait stage ensues as represented by block 566 to assure that the CPU is in operational readiness to respond to the oncoming transmission. Following this wait interval, as represented at block 568, the KBOCLK line is set low and, as represented at block 570, another waiting period ensues. As represented at block 572, a loop counter then is set to a value of 9 for purposes of transmitting eight bits in conjunction with a stop bit. The loop counter is then incremented as represented at block 574 and, as represented at line 576 and inquiry block 578, a determination is made as to whether the above-noted loop counter is at zero. In the event that it is not, then as represented at line 580 and block 582 the next bit of data is moved to the KBODATA port, the least significant bit being initially presented. The routine then sets the KBOCLK line high as represented at block 584, whereupon another wait interval ensues as represented at block 586. The KBOCLK line then is set low as represented at block 588 and a wait interval ensues as represented at block 590. The routine then returns to a decrementation of the loop counter as represented by loop line 592 and block 574.

Returning to the inquiry at block 578, in the event that the loop counter is at a zero value, then as represented by line 594 and block 596, the transmission is completed and the KBODATA line 178 is set to a logic low value. The routine then proceeds to set the KBOCLK line 186 to a logic high value as represented at block 598 and, as represented at block 600 the registers are replaced. Following this procedure, the program returns to the main program as represented at block 602.

Since certain changes may be made in the above system and apparatus without departing from the scope of the invention herein involved, it is intended that all matter contained in the above description or shown in the accompanying drawings shall be interpreted as illustrative and not in a limiting sense.

I claim:

1. Apparatus for monitoring and recording commercial transactions, comprising:

point of sale housing means for positioning at the situs of said transaction;

first keyboard means mounted upon said housing means and manually actuable to provide a select first key output representing a point of sale transaction;

second keyboard means manually actuable to provide a select second key output representing a general computer function input;

keyboard output port means for receiving and transmitting keyboard data signals including said first key output and said second key output;

switch means coupled between said keyboard output port means and said second keyboard means and controllable to assume non-conducting and conducting conditions for effecting a select transmission of said second key output from said second keyboard means to said keyboard output port means;

microprocessor means mounted with said point of sale housing means including read/write memory, processor memory retaining a unique key code corresponding with said first key output of said first keyboard means and representing an aspect of said transaction, clock means for providing a processor clock signal of predetermined frequency, said microprocessor means responsive to said first key output of said first keyboard means for accessing said processor memory for said unique key code and retaining said unique key code in said read/write memory, said microprocessor means responsive in the absence of said second key output of said second keyboard means for controlling said switch means to provide said non-conducting condition and for effecting transmission of said unique key code and processor clock signal as said keyboard data signals from said keyboard output port means, said microprocessor means responsive in the presence of said second key output of said second keyboard means to provide said switch means conducting condition to permit transmission of said second key output as said keyboard signals from said keyboard port means;

a general purpose computer mounted with said point of sale housing means, having an operating system and including an input designated port coupled with said keyboard output port means and having output designated ports, said operating system including memory means and said general purpose computer being responsive to said transmitted keyboard data signals for corresponding with a said unique key code to access a preloaded code program within said memory means and implementing said aspect to said transaction on a priority, vector interrupt basis to derive a corresponding operation output at predetermined said designated output ports, and said general purpose computer responsive to said transmitted keyboard data signals corresponding with said select second key outputs to derive a corresponding said operation output at predetermined said designated output ports;

first display means with said housing including a video generator circuit and a first visual display, said video generator circuit being coupled with a said output port and responsive to a said operation output for generating a perceptible output at said visual display; and printer means coupled with a said designated output port and responsive to said operation output for providing printed text corresponding therewith.

2. The apparatus of claim 1 in which said microprocessor means is responsive to a said first key output to access the corresponding said processor memory unique key code and retain it within said read/write memory when said switch means is in said conducting condition effecting said transmission of said second key output until said switch means non-conducting condition occurs.

3. The apparatus of claim 1 in which:

said second key output comprises second data signals and second clock signals;

said switch means is coupled to convey said second data signals when in said conducting condition; and said microprocessor means is responsive to said second clock signals for controlling said switch means to effect said conducting condition.

4. The apparatus of claim 1 in which said microprocessor means is responsive to said first key output for accessing said processor memory unique key code to effect said transmission of said unique key code in combination with a delimiter code as said keyboard data signals; and said general purpose computer is responsive to said transmitted delimiter code to identify said keyboard data signals as corresponding with a said unique key code.

5. The apparatus of claim 1 in which said microprocessor means is configured for effecting transmission of a predetermned acknowledge code as said keyboard data signals from said keyboard output port means upon power-up.

6. The apparatus of claim 1 including cash drawer means mounted wth said housing means, releasable for exposing a cash receptical and including an energizable release component coupled with a said output designated port and responsive to a said operation output as an energization of said release component to effect said cash receptical exposure.

7. The apparatus of claim 1 including second display means mountable upon said housing means, coupled with a said output designated port and responsive to a said operation output for generating a perceptible output.

8. The apparatus of claim 1 including a second visual display positionable remotely of said housing means and connectable with said video generator circuit of said first display means.

9. Apparatus for monitoring and recording commercial transactions, comprising:

point of sale housing means for positioning at the situs of said transaction;

first keyboard means mounted upon said housing means and manually actuable to provide a select first key output representing a point of sale transaction;

second keyboard means manually actuable to provide a select second key output representing a general computer function input;

keyboard output port means for receiving and transmitting keyboard data signals including said first key output and said second key output;

switch means coupled between said keyboard output port means and said second keyboard means and controllable to assume non-conducting and conducting conditions for effecting a select transmission of said second key output from said second keyboard means to said keyboard output port means;

microprocessor means mounted with said point of sale housing means including read/write memory, processor memory retaining a unique key code corresponding with said first key output of said first keyboard means and representing an aspect of said transaction, clock means for providing a processor clock signal of predetermined frequency, said microprocessor means responsive to said first key output of said first keyboard means for accessing said processor memory for said unique key code and retaining said unique key code in said read/write memory, said microprocessor means responsive in the absence of said second key output of said second keyboard means for controlling said switch means to provide said non-conducting condition and for effecting transmission of said unique key code and processor clock signal as said keyboard data signals from said keyboard output port means, said microprocessor means responsive in the presence of said second key output of said second keyboard means to provide said switch means conducting condition to permit transmission of said second key output as said keyboard data signals from said keyboard output port means;

a general purpose computer mounted with said point of sale housing means, having an operator system and including an input designated port coupled with said keyboard output port means and having output designated ports, memory means for retaining a device driver program within a basic input-output system high priority location thereof and a preloaded predetermined sequence of code program at memory applications region positions without said basic input-output system high priority locations, said operating system being:

said general purpose computer responsive to said keyboard data signals corresponding with said unique transmitted key codes to access said device driver program to establish a vector interrupt corresponding with said keyboard data signals representing said unique transmitted key codes to access said memory means retained code programs on a priority basis and effect the execution thereof to derive a corresponding operation output of predetermined said designated output ports, and said general purpose computer responsive to said transmitted keyboard data signals corresponding with said select second key outputs to derive a corresponding said operation output at predetermined said designated output ports;

first display means mounted with said housing including a video generator circuit and a first visual display, said video generator circuit being coupled with a said output designated port and responsive to a said operation output for generating a perceptible output at said first visual display; and printer means coupled with a said output designated port and responsive to said operation output for providing printed text corresponding therewith.

10. The apparatus of claim 9 in which said microprocessor means is responsive to a said first key output to access the corresponding said processor memory unique key code and retain it within said read/write memory when said switch means is in said conducting condition effecting said transmission of said second key output, until said switch means non-conducting condition occurs.

11. The apparatus of claim 9 in which:

said second key output comprises second data signals and second clock signals;

said switch means is coupled to convey said second data signals when in said conducting condition; and said microprocessor means is responsive to said second clock signals for controlling said switch means to effect said conducting condition.

12. The apparatus of claim 9 in which said general purpose computer operating system is configured to load said device driver program on power-up at a keyboard handler program priority location within the basic input-output system locations of said memory means.

13. The apparatus of claim 12 in which said general purpose computer operating system is configured to load said keyboard handler program on power-up at an applications region of said memory without said basic input-output system locations of memory.

14. The apparatus of claim 9 in which:
said microprocessor means is responsive to said select key output for accessing a said processor memory unique key code for effecting said transmission of said unique key code in conjunction with a delimiter code as a said keyboard data signal; and
said general purpose computer operating system is responsive to said transmitted delimiter code component of said keyboard data signal to effect said access to said device driver program.

15. Apparatus for monitoring and recording commercial transactions, comprising:
housing means for positioning at the situs of said transaction;
first keyboard means mounted upon said housing means and manually actuable to provide a select key output;
keyboard output port means for receiving and transmitting keyboard data signals;
microprocessor means mounted with said housing means, including a processor memory retaining a unique key code corresponding with said select key output, configured as a unique memory address and representing an aspect of said transaction, said microprocessor means having clock means for providing an output of predetermined frequency, and responsive to said select key output for accessing said processor memory unique key code for effecting transmission of said unique key code and clock output as said keyboard data signals from said keyboard output port means;
a general purpose computer mounted with said housing means, having an operating system and including an input designated port coupled with said keyboard output port means and having output designated ports, memory means for retaining a device driver program within a basic input-output system location thereof and a preloaded predetermined sequence of code programs at memory jump address locatable positions without said basic input output system locations, said operating system being responsive to said unique transmitted key codes to access said device driver program to establish a vector interrupt as a function of said unique transmitted key codes to substantially prioritize access to said memory means retained said code programs and effect the execution thereof to derive a corresponding operation output at predetermined said output ports,
first display means mounted with said housing including a video generator circuit and a first visual display, said video generator circuit being coupled with a said output designated port and responsive to a said operation output for generating a perceptible output at said first visual display; and
printer means coupled with a said output designated port and responsive to said operation output for providing printed text corresponding therewith.

16. The apparatus of claim 15 in which said general purpose computer operating system device driver program established vector interrupt jump address represents a product of said unique key code and a select multiplier summed with an offset.

17. The apparatus of claim 15 in which said general purpose computer operating system device driver program established vector interrupt jump address represents a memory retained value corresponding with said unique key code.

18. The apparatus of claim 15 in which said general purpose computer operating system is configured to load said device driver program on power-up at a keyboard handler program priority location within the basic input-output system locations of said memory means.

19. The apparatus of claim 18 in which said general purpose computer operating system is configured to load said keyboard handler program on power-up at an applicatons region of said memory without said basic input-output system locations of memory.

20. The apparatus of claim 15 in which:
said microprocessor means is responsive to said select key output for accessing said processor memory unique key code for affecting said transmission of said unique key code in conjunction with a delimiter code; and
said general purpose computer operating system is responsive to said transmitted delimiter code to effect said access to said device driver program.

21. The apparatus of claim 15 including cash drawer means mounted with said housing means releasable for exposing a cash receptacle and including an energizable release component coupled with a said output designated port and responsive to a said operation output as an energization of said release component to effect said cash receptical exposure.

22. The apparatus of claim 15 including second display means mountable upon said housing means, coupled with a said output designated port and responsive to a said operation output for generating a perceptible output.

23. The apparatus of claim 15 in which:
said microprocessor means is configured for effecting transmission of a predetermined acknowledge code as said keyboard data signals from said keyboard output port means upon power-up.

24. The apparatus of claim 15 including a second visual display positionable remotely of said housing means and connectable with said video generator circuit of said first display means.

* * * * *